May 17, 1966  C. E. ANTHONY ET AL  3,251,928
ELECTRICAL TERMINAL FOR HERMETICALLY SEALED APPLICATIONS
Filed Aug. 30, 1963

INVENTORS
Charles E. Anthony and
James W. French
BY
ATTORNEY

United States Patent Office 3,251,928
Patented May 17, 1966

3,251,928
ELECTRICAL TERMINAL FOR HERMETICALLY SEALED APPLICATIONS
Charles E. Anthony, Trafford, and James W. French, Pleasant Hills, Pa., assignors to Westinghouse Electric Corporation, East Pittsburgh, Pa., a corporation of Pennsylvania
Filed Aug. 30, 1963, Ser. No. 305,656
2 Claims. (Cl. 174—152)

The present invention is directed generally to electrical terminal arrangements and more particularly to electrical terminals which are used in conjunction with hermetically sealed apparatus wherein the integrity of the hermetic sealing of such apparatus is not disturbed.

In the construction of certain types of electrically energized apparatus, such as canned dynamoelectric machinery, it is necessary to subject the interior or rotor chamber of such dynamoelectric machinery to relatively high internal pressures, on the order of 2500 pounds per square inch. The stator structure for such dynamoelectric machinery is hermetically sealed from the rotor chamber by use of relatively thin enclosure or can. In all such devices energization of the stator windings by an external power source is achieved by the use of terminals which extend from the exterior of the device into the stator chamber. Terminals of the prior art, however, were not hermetically sealed and constituted the only portion of the dynamoelectric machine wherein a hermetic sealing of the apparatus was not achieved.

In certain applications the rotor chamber of the dynamoelectric machinery is subjected to hazardous fluids with the can protecting the stator chamber therefrom. In the event a rupture of the can were to take place, the hazardous fluid would fill entirely the voids in the stator chamber and would be in any position to pass to the exterior of the device only by means of the stator terminals.

Accordingly, it is an object of this invention to provide a new and improved electrical terminal structure which can be hermetically sealed to a housing.

Another object of this invention is to provide a new and improved terminal structure for use in conjunction with a hermetically sealed system so that, when the terminal structure is mounted in such systems, the hermetic sealing thereof is not disrupted.

Figure 1:
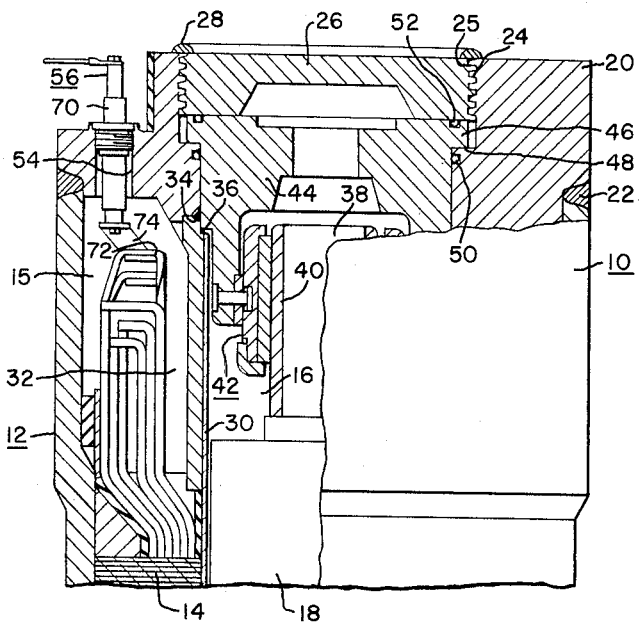
Figure 2:
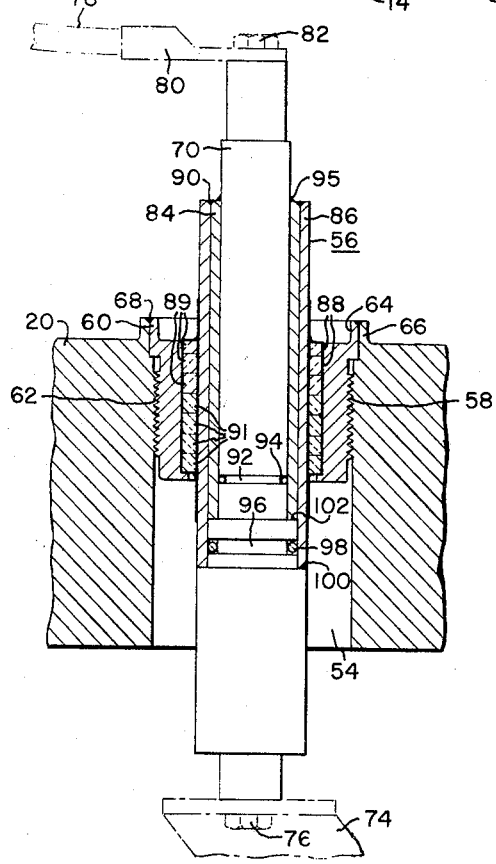

Further objects and advantages of this invention will become more apparent upon review of the following detailed description of an illustrative embodiment of this invention when taken in conjunction with the accompanying drawings, in which:

FIGURE 1 is a partial view, partially in section, of a hermetically sealed dynamoelectric machine with the terminal structure thereof being illustrated in elevation; and FIG. 2 is an enlarged sectional view of the terminal structure of this invention.

In accordance with the invention, an electrically energized apparatus is mounted within a sealed housing. A terminal passes through the housing for the purpose of energizing the apparatus with the terminal being so constructed as to retain the integrity of the interior of the housing. In furtherance of this purpose, the sealed housing normally is constructed from electrically conducting material, so that short circuiting of the electrical power from the terminal to housing must be prevented.

In accordance with the invention the terminal stud desirably is mounted within at least one metallic member and is hermetically sealed thereto. The metallic member or sheath desirably is disposed to extend through an outer bushing means, formed from a metal, which is secured to the housing and is also hermetically sealed to the housing. Intermediate the sheath and the outer metallic bushing there is disposed a quantity of insulating material with the insulating material being formed such that it is hermetically sealed both to the sheath and to the outer bushing. In this manner, the insulating material prevents the short circuiting of the electrical power directly to the housing and also retains the integrity of the sealed system.

Referring now in particular to FIG. 1, there is illustrated therein a sealed dynamoelectric machine 10 having a hermetically sealed outer casing 12 of tubular configuration. Within the outer casing 12 there is provided an annular stator space 15 in which a stator structure 14 is disposed and a central rotor bore 16 in which there is disposed a rotor 18. An end ring 20 of annular configuration is secured to the upper end of the outer casing 12 in a hermetic manner by suitable means such as by a circumferential seal weld 22. The annular end member 20 provided at its interior circumferential surface with machine threads 24 and a cover plate 26 of generally circular configuration is threadedly inserted within the end member 20 by complementary threads 25 which engage the threads 24. The hermetic sealing of the casing 12 adjacent the cover plate 26 is ensured by means of a canopy weld 28 which overlies the complementary threads 24 and 25. The rotor bore 16 is separated from the stator bore 15 of the dynamoelectric machine 10 by means of a cylindrical enclosure or can 30 which extends axially along the entire length of the rotor bore 16. An annular backup ring 32 for the can 30 is disposed in the stator space of the dynamoelectric machine 10 and extends downwardly from the end ring 20. The backup ring 32 desirably is hermetically secured to the end ring 20 by means of a peripheral seal weld 34 with the backup ring 32 engaging a substantial portion of the can 30. The stator bore 15 of the dynamoelectric machine 10 is hermetically sealed from the rotor bore 16 by means of the can 30 and the backup ring 32. In furtherance of this purpose, the can 30 is hermetically secured to backup ring 32 adjacent the upper end of the can 30 by a circumferential seal weld 36.

The rotor 18 of the dynamoelectric machine 10 is mounted on a shaft 38 with the shaft 38 being provided with a journal 40 mounted thereon. Rotation of the rotor 18 is permitted by antifrictional means 42, illustrated in this example as a sleeve bearing which receives the journal 40 therein. The sleeve bearing 42 desirably is mounted in the rotor bore 16 on a bearing support member 44 of annular configuration. The bearing support member 44 is provided with an outwardly extending flange 46 disposed adjacent the upper end thereof which is received on a shoulder 48 formed on the end ring 20. The support member 44 is fixedly positioned in engagement with the shoulder 48 by the cover 26 which clamps the flange 46 between the lower surface of the cover 26 and the shoulder 48. In applications wherein a hermetic canopy seal weld 28 is not required pressure in the stator bore 16, sealing means such as O-rings 50 and 52 are disposed between adjacent surfaces of the bearing support 44 and end ring 20 and the bearing support 44 and the cover 26, respectively may be substituted for the canopy seal 28. Of course, the sealing means 50 and 52 do not serve as a hermetic seal inasmuch as minimal leakage may occur therepast.

It will therefore be appreciated that the rotor bore 16 of a dynamoelectric machine may be subjected to poisonous or otherwise hazardous fluids at elevated temperatures and pressures. Such system fluids are prevented from entering into the stator space 15 of the dynamoelectric machine 10 by means of the can 30. However, in the event of a rupture of the relatively thin can 30 the stator space will be subjected to the elevated pressure and to the hazardous fluid. Inasmuch as the outer casing 12 in the end ring 20 constitute a hermetic enclosure of the stator space 15, the only path for such hazardous fluids from the stator bore 15 to the exterior of the dynamoelectric machine is a path adjacent the electrical terminals of the device 10.

To provide for energization of the stator structure 14, the end ring 20 of the dynamoelectric machine 10 is provided with a plurality of axially extending openings 54, of which only one is illustrated in FIG. 1. Each of the openings 54 desirably is formed to permit the insertion of a terminal member 56 to energize the stator windings.

Referring now to FIG. 2 of the drawings, it will be seen that the terminal opening 54 in the end ring 20 is provided with threads 58 formed along the outer periphery thereof adjacent the upper end. The terminal 56 is provided with an outer mounting bushing 60 having complementary threads 62 formed thereon which permit the bushings to be threadedly inserted into the opening 54. Hermetic sealing of the outer periphery of the bushing 60 to the end ring 20 is provided by a pair of complementary flanges 64 and 66 formed respectively on the bushing 60 and the end ring 20. A circumferential seal weld 68 terminates the joint of the complementary flanges 64 and 66 to prevent a leakage path from the interior of the stator bore along the threads 58 and 62 to the exterior of the dynamoelectric machine 10.

The terminal 56 includes a terminal stud 70 formed from electrical conducting material such as copper and its alloys or aluminum. The terminal stud 70 desirably is electrically connected to the winding end turns 72 by suitable means for example, an electrically conducting strap 74 which engages at its lower end the end turn 72 and which is secured to the terminal stud 70 adjacent its lower end by suitable means such as by brazing or by a machine screw 76, with the latter being threadedly received by the terminal stud 70. The upper end of the terminal stud 70 desirably is electrically connected to a conductor 78 having suitable means such as a connecting lug 80 mounted thereon to facilitate such connection. In furtherance of this purpose a machine screw 82 secures the lug 80 to the upper end of the terminal stud 70 by means of a threaded opening formed in the upper end of the terminal stud 70 and an opening formed in lug 80. The conductor 78 is adapted to be connected to a power source for the purpose of energizing at least one of the stator windings.

It will therefore be seen that electrical current passes along the terminal stud 70 through an opening 54 in the end ring 20. Means are provided to prevent the short circuiting of the current passing along the terminal stud 70 to the end ring 20. In this example of the invention, the last-mentioned means comprises a pair of metallic sleeves 84 and 86 with the terminal passing through the central opening in the sleeve 84 and with the sleeve 86 receiving the sleeve 84 therein.

It is to be realized that, in the fabrication of a metal-to-insulator seal for the terminal 56, the coefficients of expansion of the various components which form the terminal 56 must be carefully matched so that when the seals are made, normally at elevated temperatures, subsequent cooling and thermal cyclic of the components of the terminal 56 does not cause cracking of the areas of joinder. In accordance with this invention, the insulation sealing material desirably is formed from any suitable material capable of withstanding the relatively high internal pressures and temperatures to which the terminal 56 may be subjected. In addition, the insulating material desirably is formed from a material having high strength and capable of withstanding substantial shock.

In accordance with the invention, numerous insulating materials are known to those of ordinary skill in the art and are capable of being employed in the fabrication of the hermetically sealed terminal 56. Accordingly, the following description of matched components for the terminal 56 constitutes one of many possible examples.

It has been determined that the insulating materials disposed between the bushing 60 and the sleeve 86 desirably includes a plurality of tandemly mounted rings 88 formed from insulating material for example from a ceramic glass composition.

In accordance with the invention, the sleeve 86, rings 88 and bushing 60, are assembled in the manner illustrated in FIG. 2 and is heated to an elevated temperature for the purpose of melting the rings 88 to form a bond or seal between the sleeve 86, rings 88 and bushing 60 as well as a bond between adjacent rings 88 of the assembly. The sleeve 84 is disposed in the sleeve 86 and a circumferential weld 90 is made therebetween adjacent the upper end of each of the sleeves 84 and 86. The terminal stud 70 is then inserted into the sleeve 84 through the lower ends of the sleeve 84 as illustrated in FIG. 2. The material forming the sleeve 84 is matched with the material forming the stud 70 so that a leak-tight seal may be made therebetween by conventional means such as by brazing or by welding as indicated by the reference character 95. In the event a brazed joint between the stud 70 and sleeve 84 is desired, sealing means such as weld metal or braze metal can be applied between the stud 70 and the sleeve 84. In furtherance of this purpose an annular groove 92 desirably is formed on the stud 70 at a position juxtaposed to the sleeve 84 and a suitable sealing material, designated by the reference character 94, formed from any suitable material such as filler metal desirably is packed into the annular groove 92. One example of a suitable braze metal is an alloy of silver and copper. The assembly of the stud 70 and the sleeve 84 is then heated to a temperature at which the braze or filler metal 94 is melted. Subsequently the stud 70 and sleeve 84 are cooled causing the material 94 to solidify and to form a hermetic seal between the stud 70 and the sleeve 84.

The sleeve 84 with the stud 70 secured thereto is inserted upper end first into the lower end of the sleeve 86, with the latter being secured to the bushing 60 and rings 88. A circumferential weld 90 is made between the upper ends of the sleeves 84 and 86. A second annular groove 96 is formed in the outer surface of the stud 70 at a position juxtaposed to a portion of the sleeve 86. A suitable sealing means such as an O-ring 98 is disposed in the groove 96. The sealing means 98 serves to prevent the pressure on the interior of the casing 12 from passing beyond the sealing means 98 to weld 90.

In addition, it will be noted that a pair of upwardly facing shoulders 100 and 102 are respectively formed on the stud 70 and are disposed to engage respectively the lower ends of the sleeves 86 and 84. Accordingly, the combination of the shoulders 100 and 102 with the sealing means 98 provides a step type seal between the conductor 70 and the sleeves 84 and 86. As is known by those skilled in the art, a step type seal is capable of providing increased sealing action.

In accordance with the invention, the terminal assembly 56 desirably is assembled utilizing the following assembly procedure and materials. The terminal stud 70 is provided with filler metal 94 to fill the annular recess 92. The terminal stud 70 is then inserted, upper end first, into the sleeve 84 until the lower end of the sleeve 84 engages the shoulder 102. The material forming the sleeve 84 and the stud 70 desirably are chosen to have nearly equal coefficients of expansion and can comprise for example a terminal 70 of copper or alloy of copper having a coefficient of expansion of between $98 \times 10^{-7}$ to $112 \times 10^{-7}$ per degree Fahrenheit. The sleeve 84 desirably is formed from No. 304 stainless steel having a coefficient of expansion range between $96 \times 10^{-7}$ to $112 \times 10^{-7}$ per degree Fahrenheit. In this manner, upon heating the sleeve 84 and stud 70 for the purpose of melting the filler metal 94 to effect a seal therebetween, the relative coefficient of expansion, being nearly equal, will produce a good seal. Such a seal may be achieved by the aforedescribed brazing technique and can also include the circumferential weld 95.

The materials forming the bushing 60, sleeve 86, rings 88 must also be chosen to have compatible relative thermal expansion properties. The ceramic rings 88 may be formed from a ceramic glass composition known in the art, for example, a composition having a coefficient of thermal expansion on the order of $65 \times 10^{-7}$ per degree Fahrenheit and formed from cordierite $$(2MgO \cdot 2Al_2O_3 \cdot 5SiO_2)$$

cristobalite ($SiO_2$), rutile ($TiO_2$), spinel ($MgAl_2O_4$) and magnesium metasilicate ($MgSiO_3$). The ceramic glass set forth above can be formed from initial quantities of silica, alumina, magnesia and small amounts of titania by methods known in the art. The outer bushing 60 of the terminal 56 desirably is formed from a compatible material such as Inconel X having a coefficient of thermal expansion on the order of $75 \times 10^{-7}$ per degree Fahrenheit and the sleeve 86 may be formed from No. 410 stainless steel having a thermal expansion coefficient on the order of $61\text{-}76 \times 10^{-7}$ per degree Fahrenheit. The selection of No. 410 stainless steel for the sleeve 86 is also helpful inasmuch as a weld between No. 410 stainless steel and No. 304 stainless steel of which the sleeve 84 is made, can be easily achieved.

To effect the ceramic to metallic seal for the insulator 56, the rings are then inserted in tandem relation into the central opening in the bushing 60 and the sleeve 86 is inserted into the central openings formed by the rings 88. The latter assembly is then heated to a temperature on the order of 900 to 1150° C. to permit the rings to soften and to flow and is subsequently cooled to effect a hermetic seal between all of the components. It will be noted that the rings 88 are formed from insulating material so that insulated joint is made between the sleeve 86 and the bushing 60.

It is to be realized that other insulating materials may be substituted for the rings 88. For example, with the bushings 60 formed from Inconel X and the sleeve 86 from No. 410 stainless steel, the ring members 88 may be formed from Ceramicite, a ceramic, insulating product of the Consolidated Electrodynamics Corporation which has been found thermally compatible with Inconel X and No. 410 stainless steel. If the Ceramicite composition is utilized the upper three bushings 89 may be formed from a refractory type ceramic glass while the lower four rings 91 may be formed from a vitreous type ceramic glass.

To complete the assembly of the terminal 56, the O-ring 98 is disposed in the circumferential groove 96 formed in the stud 70, and the stud 70 with the sleeve 84 secured thereto is then inserted, upper end first into the lower end (as viewed in FIG. 2) of the sleeve 86 until the lower end of the sleeve 86 engages the shoulder 100. The seal weld 90 is then made along the circumference of the upper surfaces of the sleeves 84 and 86 to complete the hermetic sealing of the terminal 56. The distance between the upper ends of the sleeves 84 and 86 and the bushings 88 desirably is maximized so that the amount of heat generated in making the weld 90 passing to the bushings 88 is minimized.

It will be realized, of course, that a single sleeve may be substituted for the sleeves 84 and 86 for certain applications of this invention. For example, a single sleeve of No. 304 stainless steel may be utilized with insulating rings 88 if the latter rings are thermally compatible therewith.

It will be further realized that many modifications may be made in the specific examples described herein, which modifications remain within the spirit and scope of this invention. Accordingly it is specifically intended that the embodiment of the invention illustrated herein be interpreted in an illustrative, rather than in a limiting sense.

We claim as our invention:

1. A terminal arrangement comprising an annular bushing having a central opening extending therethrough and having an inwardly extending flange disposed adjacent one end of the central opening thereof, an insulating ring closely received in said opening and engaging said flange, a first metallic sleeve member closely received within the central opening of said insulating ring, a second sleeve member closely received within the central opening of said first sleeve member, said second sleeve member having one of its ends terminating within said first sleeve member, a terminal stud of stepped configuration mounted in the opening formed by said first and said second sleeve members, said stud having a shoulder formed thereon engaging said one end of said second sleeve member, said stud having an additional shoulder formed thereon engaging the corresponding end of said first sleeve member, an annular groove formed on said stud at a position juxtaposed to said second sleeve member, first sealing means formed in said annular groove, a second annular groove formed in said stud intermediate said first and said second shoulders and juxtaposed to said first sleeve member, second sealing means disposed in said second annular groove, said second sleeve member being formed from a material thermally compatible with the material forming said terminal stud, said first sealing means hermetically securing said second sleeve member to said terminal stud, said first sleeve member being formed from a material thermally compatible with said insulating ring and with said second sleeve member, said insulating ring being hermetically secured both to said bushing and to said first sleeve member, and means including a circumferential weld for hermetically securing said first sleeve member to said second sleeve member adjacent the other corresponding ends thereof.

2. A terminal arrangement comprising an annular bushing having a central opening extending therethrough, an insulating ring closely received in said opening, a first metallic sleeve member closely received within the central opening of said insulating ring, a second sleeve member closely received within the central opening of said first sleeve member, said second sleeve member having one of its ends terminating within said first sleeve member, a terminal stud of stepped configuration mounted in the opening formed by said first and said second sleeve members, said stud having a shoulder formed thereon engaging said one end of said second sleeve member, said stud having an additional shoulder formed thereon engaging the corresponding end of said first sleeve member, first sealing means hermetically securing said stud to said second sleeve member, second sealing means positioned on said stud intermediate said first and said second shoulders and juxtaposed to said first sleeve member, said second sleeve member being formed from a material thermally compatible with the material forming said terminal stud, said first sleeve member being formed from a material thermally compatible with said insulating ring and with said second sleeve member, said insulating ring being hermetically secured both to said bushing and to said first sleeve member, and means including a circumferential weld for hermetically securing said first sleeve member to said second sleeve member adjacent the other corresponding ends thereof.

References Cited by the Examiner

UNITED STATES PATENTS

| | | | |
|---|---|---|---|
| 1,575,994 | 3/1926 | Laise | 174—50.61 |
| 2,138,660 | 11/1938 | Mann | 174—152 X |
| 2,669,702 | 2/1954 | Klostermann. | |
| 3,017,452 | 1/1962 | Rongved | 174—152 |

LARAMIE E. ASKIN, *Primary Examiner.*